US008847943B2

(12) United States Patent
Ahn

(10) Patent No.: US 8,847,943 B2

(45) Date of Patent: Sep. 30, 2014

(54) ORGANIC LIGHT EMITTING DISPLAY

(75) Inventor: Jeong-Keun Ahn, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 107 days.

(21) Appl. No.: 13/470,682

(22) Filed: May 14, 2012

(65) Prior Publication Data

US 2013/0201169 A1 Aug. 8, 2013

(30) Foreign Application Priority Data

Feb. 8, 2012 (KR) ........................ 10-2012-0012823

(51) Int. Cl.
*G06F 3/038* (2013.01)
*G09G 5/10* (2006.01)

(52) U.S. Cl.
USPC .......................................... 345/211; 345/690

(58) Field of Classification Search
USPC ......................................... 345/211, 173, 178
See application file for complete search history.

(56) References Cited

U.S. PATENT DOCUMENTS

2005/0140306 A1 6/2005 Park
2005/0146264 A1* 7/2005 Kwak et al. .................. 313/504
2008/0272992 A1* 11/2008 Kwak ............................ 345/76

FOREIGN PATENT DOCUMENTS

KR 10-2005-0065947 A 6/2005
KR 10-2005-0072010 A 7/2005
KR 10-2005-0081540 A 8/2005
KR 10-2006-0065083 A 6/2006
KR 10-2009-0078633 A 7/2009

* cited by examiner

*Primary Examiner* — Michael Faragalla
(74) *Attorney, Agent, or Firm* — Lee & Morse, P.C.

(57) ABSTRACT

An organic light emitting display including an image display unit including a plurality of data lines arranged in a first direction, a plurality of scan lines arranged in a second direction, and a plurality of pixels arranged at intersections of the data lines and the scan lines; a plurality of main power source lines and auxiliary power source lines arranged to intersect each other, the plurality of main power source lines and auxiliary power source lines transmitting a first power source as a pixel power source to the pixels; and auxiliary metal layers overlapping portions of the auxiliary power source lines in regions between adjacent pixels, the auxiliary metal layers having a lower resistance value than a resistance value of the auxiliary power source lines, wherein the auxiliary metal layers are electrically coupled with the auxiliary power source lines.

13 Claims, 2 Drawing Sheets

ORGANIC LIGHT EMITTING DISPLAY

CROSS-REFERENCE TO RELATED APPLICATION

This application claims priority to and the benefit of Korean Patent Application No. 10-2012-0012823, filed on Feb. 8, 2012, in the Korean Intellectual Property Office, the entire content of which is incorporated herein by reference.

BACKGROUND

1. Field

Embodiments relate to an organic light emitting display. The embodiments provide an organic light emitting display that helps prevent an IR drop in a first power source that serves a pixel power source.

2. Description of the Related Art

Flat panel displays (FPD) may include liquid crystal displays (LCD), field emission displays (FED), plasma display panels (PDP), and organic light emitting displays. For example, the organic light emitting display may display an image using organic light emitting diodes (OLED) as self-emission elements that generate light by recombination of electrons and holes.

The organic light emitting display may be classified as a passive matrix organic light emitting display or an active matrix organic light emitting display depending upon a driving method.

In the active matrix organic light emitting display, a plurality of pixels may be arranged in a matrix (realized or formed by intersections of a plurality of scan lines and data lines), and the pixels (coupled with the scan lines and the data lines) may control emission of the OLEDs included in the pixels using thin film transistors (TFT) and capacitors in the pixels.

For example, a first power source ELVDD (as a pixel power source) may be applied to a first electrode (anode electrode) of the OLED, and a second power source ELVSS may be applied to a second electrode (cathode electrode) of the OLED. A brightness of each of the pixels may be determined in accordance with an amount of current that flows from the first electrode to the second electrode.

SUMMARY

Accordingly, the embodiments provide an organic light emitting display where, in power source lines in a mesh type structure that include main power source lines and auxiliary power source lines arranged to intersect each other in order to provide a first power source as a pixel power source to pixels, an auxiliary metal layer realized by a low resistance metal material that reduces the resistance of the auxiliary power source lines is formed on the auxiliary power source lines arranged between the pixels in the form of an island to minimize a difference in a resistance value between the main power source lines and the auxiliary power source lines so that it is possible to prevent the IR drop in the power source lines.

In order to achieve the foregoing and/or other aspects of the embodiments, there is provided an organic light emitting display, including an image display using including a plurality of data lines arranged in a first direction, a plurality of scan lines arranged in a second direction, and a plurality of pixels arranged at intersections of the data lines and the scan lines, a plurality of main power source lines and auxiliary power source lines arranged to intersect each other in order to transmit a first power source as a pixel power source to the pixels, and auxiliary metal layers having a lower resistance value than a resistance value of the auxiliary power source lines and formed on the auxiliary power source lines arranged in regions between the adjacent pixels to overlap each other. The auxiliary electrode layers are electrically coupled to the auxiliary power source lines.

The auxiliary power source lines and the auxiliary metal layers are electrically coupled to each other by a plurality of contact holes of an insulating layer interposed between overlapping regions.

The auxiliary power source lines are realized by the same metal material as the scan lines in the same layer as the scan lines. The main power source lines are formed in an upper layer of the auxiliary power source lines and are realized by the same metal material as the data lines in the same layer as the data lines.

The main power source lines and the auxiliary power source lines are electrically coupled to each other by contact holes of an insulating layer interposed between intersecting regions.

The main power source lines are arranged to run parallel with the data lines. The auxiliary power source lines are arranged to run parallel with the scan lines.

The auxiliary metal layer is realized by the same metal material as the main power source line.

In the region between the adjacent pixels, the area of the auxiliary power source lines is realized to be larger than an area of auxiliary power source lines arranged in another region to correspond to the region between the adjacent pixels. The auxiliary metal layers are formed to be divided in regions that overlap the regions of the enlarged auxiliary power source lines.

A power source supply unit for providing the first power source is further provided to at least one of the main power source line and the auxiliary power source line. The power source supply unit is realized to be plural to divide the same first power source and to provide the divided first power sources from at least two sides of the image display unit.

The area of the auxiliary metal layers that overlap the auxiliary power source lines to be electrically coupled to the auxiliary power source lines is controlled by position formed on the image display unit. The area of the auxiliary metal layers increases as the auxiliary metal layers are remote from the first power source applied from the power source supply unit.

According to the embodiments, in the power source lines having the mesh type structure, the difference in the resistance value between the main power source lines and the auxiliary power source lines may be minimized, so that it is possible to prevent the IR drop in the power source lines and to prevent the brightness of the entire image display unit from being non-uniform.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
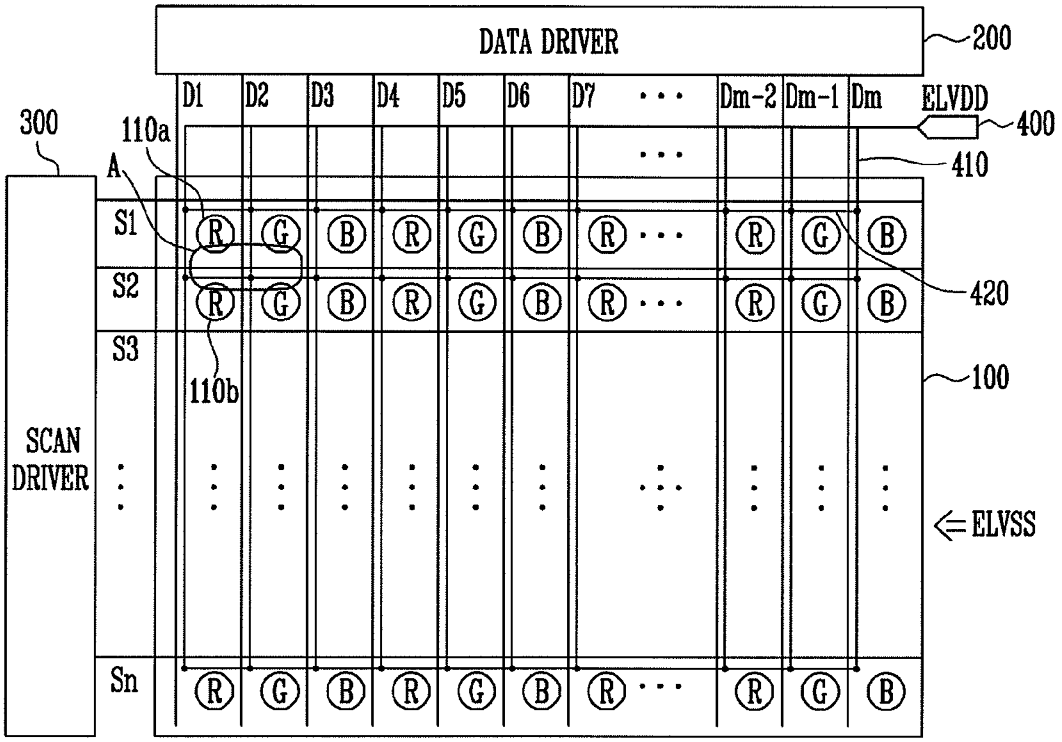
FIG. 1 illustrates a schematic block diagram of an organic light emitting display according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic block diagram of an organic light emitting display according to an embodiment.

Referring to FIG. 1, the organic light emitting display according to the present embodiment may include an image display unit 100 (for displaying an image), a data driver 200 (for transmitting data signals), and a scan driver 300 (for transmitting scan signals).

The image display unit 100 may include a plurality of scan lines S1, S2, . . . , Sn−1, and Sn arranged in a row direction, a plurality of data lines D1, D2, . . . , Dm−1, and Dm arranged in a column direction, a plurality of pixels 110 (arranged at intersections of the data lines and the scan lines and including organic light emitting diodes (OLED) and pixel circuits), and a plurality of main power source lines 410 and auxiliary power source lines 420 (for transmitting a first power source ELVDD as a pixel power source to the plurality of pixels). A second power source ELVSS (having a lower potential than the first power source ELVDD) may be applied to the image display unit 100.

In addition, a power source supply unit 400 (for providing the first power source ELVDD) may be further included in the main power source lines 410 and/or the auxiliary power source lines 420.

In FIG. 1, a single power source supply unit 400 is shown. However, the embodiments are not limited thereto, and a plurality of power source supply units 400 may be included. The same first power source ELVDD may be divided to be applied to the power source lines 410 or the auxiliary power source lines 420 on various sides of the image display unit through the plurality of power source supply units 400.

The power source lines 410 and 420 (for applying the first power source ELVDD to the image display unit 100) may be arranged in a mesh type structure. In the mesh type structure, as illustrated in FIG. 1, the main power source lines 410 may be arranged in a first direction, e.g., a column direction, and the auxiliary power source lines 420 may be electrically coupled with the main power source lines 410 and arranged in a second direction, e.g., a row direction, to intersect the main power source lines 410.

For example, in the embodiment illustrated in FIG. 1, the main power source lines 410 may be arranged to run parallel with the data lines D, and the auxiliary power source lines 420 may be arranged to run parallel with the scan lines S.

Therefore, the main power source lines 410 may be formed of a same metal material as the data lines D and in a same layer as, e.g., coplanar with, the data lines D. The auxiliary power source lines 420 may be formed of a same metal material as the scan lines S and in a same layer as, e.g., coplanar with, the scan lines S.

In general, the resistance of the metal material forming the scan lines S may be higher than the resistance of the metal material forming the data lines D. Thus, the resistance in the second direction in which the auxiliary power source lines 420 are arranged may increase, and thus the flow of current of the applied first power source ELVDD in the second direction may not be uniform in comparison with the flow of current of the applied first power source ELVDD in the first direction. Therefore, although the power source lines may have the mesh type structure, the IR drop in the power source lines may not be significantly reduced.

Figure 3:
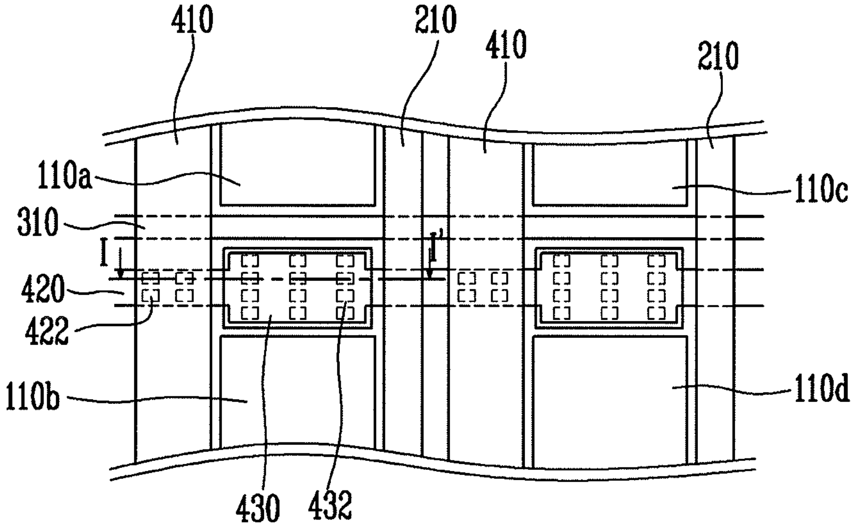
FIG. 3 illustrates a plan view of a specific region A of the organic light emitting display according to an embodiment.
Figure 4:
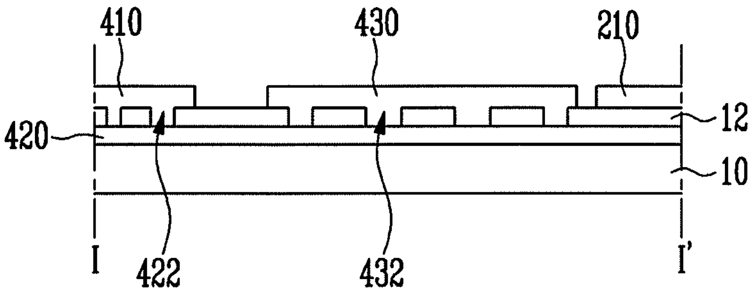
FIG. 4 illustrates a sectional view of a partial region of FIG. 3 taken along line I-I'.

In an embodiment, in order to prevent the IR drop in the power source lines, an auxiliary metal layer (430, see FIGS. 3 and 4) formed of a low resistance metal material that reduces the resistance of the auxiliary power source lines 420 may be formed on the auxiliary power source lines 420 arranged in a region (e.g., a region A of FIG. 1) between adjacent pixels 110*a* and 110*b* in the form of an island so that a difference in a resistance value between the main power source lines 410 and the auxiliary power source lines 420 may be minimized, which will be described in detail below with reference to FIGS. 3 and 4.

Figure 2:
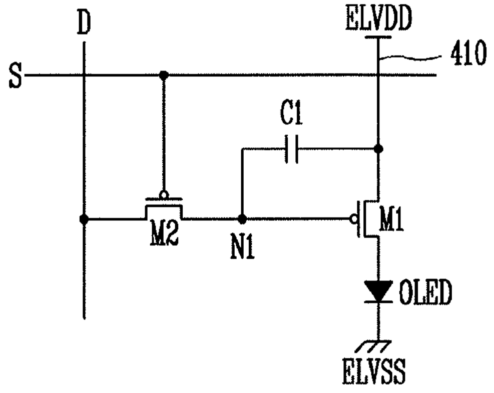
FIG. 2 illustrates a circuit diagram of an embodiment of the structure of the pixel of FIG. 1.

FIG. 2 illustrates a circuit diagram of an embodiment of the structure of the pixel of FIG. 1.

The pixel illustrated in FIG. 2 has a structure in which the organic light emitting display according to the embodiment is driven by a digital driving method. However, the structure of the pixel according to the embodiment is not limited to the structure of FIG. 2.

Referring to FIG. 2, the pixel may include a pixel circuit and an organic light emitting diode (OLED). The pixel circuit may include a first transistor M1, a second transistor M2, and a capacitor C1. Each of the first transistor M1 and the second transistor M2 may include a source, a drain, and a gate, and the capacitor C1 may include a first electrode and a second electrode.

The source of the first transistor M1 may be coupled with the first power source line 410 for supplying the first power source ELVDD as the pixel power source, the drain of the first transistor M1 may be coupled with the anode electrode of the OLED, and the gate of the first transistor ml may be coupled with a first node N1. In addition, the first node N1 may be coupled with the drain of the second transistor M2. For example, the first transistor M1 may supply the current corresponding to a data signal to the OLED. The second power source ELVSS may be coupled with the cathode electrode of the OLED.

In addition, the source of the second transistor M2 may be coupled with a data line D, the drain of the second transistor M2 may be coupled with the first node N1, and the gate of the second transistor M2 may be coupled with a scan line S. The data signal may be transmitted to the first node n1 in accordance with the scan signal applied to the gate.

The first electrode of the capacitor C1 may be coupled with the first power source line 410, and the second electrode of the capacitor C1 may be coupled with the first node N1 to charge a charge in accordance with the data signal applied to the pixel, to apply a signal to the gate of the first transistor M1 for the time of one frame by the charged charge, and to maintain the operation of the first transistor M1 for the time of one frame.

FIG. 3 illustrates a plan view of a specific region A of the organic light emitting display according to an embodiment. FIG. 4 illustrates a sectional view of a partial region of FIG. 3 taken along line I-I'.

Referring to FIG. 3, a data line 210 and a scan line 310 (arranged in a region among or between four adjacent pixels 110*a*, 110*b*, 110*c*, and 110*d*), a main power source line 410 (arranged to run parallel with the data line 210), and an auxiliary power source line 420 (arranged to run parallel with the scan line 310) are illustrated.

The power source lines in the mesh type structure according to the embodiment may include the main power source lines 410 (arranged in the first direction, e.g., the column direction) and the auxiliary power source lines 420 (electrically coupled with the main power source lines 410 and arranged in the second direction, e.g., the row direction, and intersecting the main power source lines 410).

The auxiliary power source line 420 may be formed of a same metal material as the scan line 310 in the same layer as, e.g., coplanar with, the scan line 310 formed on a substrate 10. The main power source line 410 (formed in an upper layer of, e.g., on, the auxiliary power source line 420 may be formed of a same metal material as the data line 210 in the same layer as, e.g., coplanar with, the data line 210.

The main power source line 410 and the auxiliary power source line 420 may be insulated by an insulating layer 12 interposed therebetween. Thus, contact holes 422 may be formed in the insulating layer 12 in a region in which the main power source line 410 and the auxiliary power source line 420 intersect each other in order to facilitate electrical coupling, as illustrated in FIG. 3.

As shown in FIGS. 3 and 4, the contact holes 422 may be formed in all of the regions where the main power source lines 410 and the auxiliary power source lines 420 intersect each other. However, in a method where different first power sources ELVDD are applied to red, green, and blue pixels, the contact holes 422 may be formed in regions where the main power source lines 410 and the auxiliary power source lines 420 intersect each other once every three pixels of the respective colors.

As described above, the resistance of the metal material that forms the scan lines may be higher than the resistance of the metal material that forms the data lines so that the resistance of the second direction (in which the auxiliary power source lines 420 are arranged) may increase.

According to an embodiment, referring to FIGS. 3 and 4, the auxiliary metal layer 430 (formed of a low resistance metal material that may help reduce the resistance of the auxiliary power source line 420, e.g., that has a lower resistance value than the resistance value of the auxiliary power source line 420) may be formed on the auxiliary power source lines 420 in a region between the adjacent pixels 110*a* and 110*b* in the form of an island to help minimize a difference in a resistance value between the main power source line 410 and the auxiliary power source line 420.

For example, according to an embodiment, the region between vertically adjacent pixels 110*a* and 110*b* may be maximally secured in the regions where the auxiliary power source line 420 is provided, the area of the auxiliary power source line 420 may be increased to correspond to the secured region, and the auxiliary metal layer 430 that overlaps the increased area may be electrically coupled with the auxiliary power source line 420 to reduce the resistance of the auxiliary power source line 420.

In an implementation, the auxiliary metal layer 430 may be formed of a same metal material as the main power source line 410, e.g., the data line 210.

For example, the auxiliary metal layer 430 may be in the form of an island (as illustrated in FIG. 4) to be electrically coupled with the auxiliary power source line 420 corresponding to the auxiliary metal layer 430. No signal may be applied to the auxiliary metal layer 430. Thus, the auxiliary metal layer 430 may only reduce the resistance value of the auxiliary power source line 420.

In addition, electric coupling between the auxiliary power source line 420 and the auxiliary metal layer 430 may be realized by forming contact holes 432 in an insulating layer 12 in a region where the auxiliary power source line 420 and the auxiliary metal layer 430 overlap each other, as illustrated in FIG. 4.

A number of contact holes 432 is preferably as large as possible. Current density may be high along an isoelectric line around the contact holes. Thus, when the plurality of contact holes are formed, a plurality of regions having high current density of the same level are formed along the isoelectric line around the contact holes so that it is advantageous in term of current mobility.

For example, the IR drop in the auxiliary power source line 420 may be effectively reduced in accordance with the increase in the current mobility.

In addition, according to an embodiment, in the region between the adjacent pixels, the area of the auxiliary metal layer 430 that overlaps the auxiliary power source line 420 to be electrically coupled to the auxiliary power source line 420 may be controlled by a position in which the auxiliary metal layer 430 is formed.

For example, when it is assumed that the power source supply unit 400 illustrated in FIG. 1 is provided in pairs to supply the first power source ELVDD on the upper and lower sides of the image display unit 100, the IR drop in the power source lines may increase toward a center of the image display unit 100, e.g., remotest or furthest from the power source supply unit 400, and the region may darken.

According to an embodiment, an area of the auxiliary metal layer 430 that overlaps the auxiliary power source line 420 in the central region may be larger than an area of the auxiliary metal layer 430 positioned on the upper and lower sides of the image display unit 100, e.g., away from the center or central region, thereby reducing an IR drop in the central region.

By way of summation and review, the first power source ELVDD may supply a uniform voltage to the plurality of pixels. The first power source ELVDD may be applied through a plurality of power source lines coupled with the pixels. However, a uniform first power source may not be applied in accordance with the position of a pixel due to an IR drop generated by the power source lines.

When the voltage of the first power source varies in accordance with the position of a pixel, an amount of current that flows to each of the pixels may vary so that the brightness may become undesirably non-uniform.

The power source lines may be arranged in a mesh type structure in order to reduce the IR drop in the power source lines to which the first power source is applied.

For example, the power source lines may include main power source lines (coupled with the first power source an arranged in a first direction) and auxiliary power source lines (electrically coupled with the main power source lines in order to compensate for the IR drop in the main power source lines and arranged in a second direction to intersect the main power source lines).

However, in the mesh type structure, the main power source lines and the auxiliary power source lines may be formed of different materials, e.g., metals having different resistance values, on different layers. Thus, current that flows in the power source lines may be distorted, and it may be difficult to reduce and/or prevent the IR drop.

For example, the main power source lines may be formed of a same metal as the data lines and the source electrodes of the TFTs included in the pixels, and the auxiliary power source lines may be formed of a same metal as scan lines and gate electrodes of the TFTs. A resistance value of the metal of the gate electrodes may be larger than a resistance value of the metal of the source electrodes. Thus, even when the power source lines are formed in the mesh type structure, the IR drop in the power source lines may not be significantly reduced. Such an IR drop may become severe as a size of a panel increases.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An organic light emitting display, comprising:

an image display unit including:

a plurality of data lines arranged in a first direction, a plurality of scan lines arranged in a second direction, and a plurality of pixels arranged at intersections of the data lines and the scan lines;

a plurality of main power source lines and auxiliary power source lines arranged to intersect each other, the plurality of main power source lines and auxiliary power source lines transmitting a first power source as a pixel power source to the pixels; and auxiliary metal layers overlapping portions of the auxiliary power source lines in regions between adjacent pixels of the plurality of pixels, the auxiliary metal layers having a lower resistance value than a resistance value of the auxiliary power source lines, wherein the auxiliary metal layers are electrically coupled with the auxiliary power source lines.

2. The organic light emitting display as claimed in claim 1, wherein the auxiliary power source lines and the auxiliary metal layers are electrically coupled with each other by a plurality of contact holes in an insulating layer interposed between overlapping regions of the auxiliary power source lines and the auxiliary metal layers.

3. The organic light emitting display as claimed in claim 1, wherein the auxiliary power source lines include a same metal material as the scan lines and on a same layer as the scan lines, and wherein the main power source lines are on an upper layer of the auxiliary power source lines, include a same metal material as the data lines, and are on a same layer as the data lines.

4. The organic light emitting display as claimed in claim 1, wherein the main power source lines and the auxiliary power source lines are electrically coupled with each other by contact holes in an insulating layer interposed between intersecting regions of the main power source lines and the auxiliary power source lines.

5. The organic light emitting display as claimed in claim 1, wherein the main power source lines are arranged to run parallel with the data lines, and wherein the auxiliary power source lines are arranged to run parallel with the scan lines.

6. The organic light emitting display as claimed in claim 1, wherein the auxiliary metal layers include a same metal material as the main power source lines.

7. The organic light emitting display as claimed in claim 1, wherein an area of the auxiliary power source lines in regions between adjacent pixels is enlarged relative to an area of auxiliary power source lines in regions other than the regions between adjacent pixels.

8. The organic light emitting display as claimed in claim 7, wherein the auxiliary metal layers are formed in regions that overlap the enlarged regions of the auxiliary power source lines between adjacent pixels.

9. The organic light emitting display as claimed in claim 1, further comprising at least one power source supply unit, the at least one power source supply unit providing the first power source to at least one of the main power source line and the auxiliary power source line.

10. The organic light emitting display as claimed in claim 9, wherein the organic light emitting display includes a plurality of the power source supply units, the plurality of power source supply units dividing the first power source and providing the divided first power sources from at least two sides of the image display unit.

11. The organic light emitting display as claimed in claim 9, wherein an area of the auxiliary metal layers that overlap and are electrically coupled with the auxiliary power source lines is selected based on a position of the auxiliary metal layers on the image display unit.

12. The organic light emitting display as claimed in claim 11, wherein the area of the auxiliary metal layers increases relative to a distance thereof from the first power source applied from the power source supply unit.

13. The organic light emitting display as claimed in claim 1, wherein the auxiliary metal layers are coplanar with the plurality of main power source lines.

* * * * *